(12) United States Patent
Yaguchi

(10) Patent No.: US 9,497,354 B2
(45) Date of Patent: Nov. 15, 2016

(54) PRINT APPARATUS AND ITS CONTROL METHOD

(75) Inventor: Hiroyuki Yaguchi, Ichikawa (JP)

(73) Assignee: Canon Kabushiki Kaisha, Tokyo (JP)

(*) Notice: Subject to any disclaimer, the term of this patent is extended or adjusted under 35 U.S.C. 154(b) by 420 days.

(21) Appl. No.: 13/206,864

(22) Filed: Aug. 10, 2011

(65) Prior Publication Data
US 2012/0050764 A1 Mar. 1, 2012

(30) Foreign Application Priority Data
Aug. 24, 2010 (JP) .................................. 2010-186774

(51) Int. Cl.
| | |
|---|---|
| G06F 3/12 | (2006.01) |
| G06F 15/00 | (2006.01) |
| G06K 15/00 | (2006.01) |
| H04N 1/00 | (2006.01) |
| H04N 1/40 | (2006.01) |
| H04N 1/54 | (2006.01) |

(52) U.S. Cl.
CPC ........................................ *H04N 1/54* (2013.01)

(58) Field of Classification Search
CPC ............ H04N 1/00278; H04N 1/00885; H04N 1/00899; H04N 1/00901
USPC .............. 347/188, 172, 218, 183; 101/128.4, 101/116, 128.21
See application file for complete search history.

(56) References Cited

U.S. PATENT DOCUMENTS

| | | | | |
|---|---|---|---|---|
| 4,777,496 A | * | 10/1988 | Maejima | ................ H04N 1/506 101/463.1 |
| 5,392,059 A | * | 2/1995 | Ueno | .................... B41M 7/0027 347/188 |
| 5,965,485 A | * | 10/1999 | Mizumachi | .......... B41M 7/0027 428/195.1 |
| 6,380,965 B1 | * | 4/2002 | Sims | ...................... B41J 3/4075 347/218 |
| 7,878,117 B2 | * | 2/2011 | Katoh | ........................ B41J 2/32 101/116 |
| 8,400,485 B2 | * | 3/2013 | Hirota | ..................... B41J 17/38 347/217 |

(Continued)

FOREIGN PATENT DOCUMENTS

| | | |
|---|---|---|
| CN | 101665032 A | 3/2010 |
| JP | 2002-211017 A | 7/2002 |

(Continued)

OTHER PUBLICATIONS

The above foreign references were cited in a Jan. 24, 2014 Chinese Office Action, a copy of which is enclosed with an English Translation, that issued in Chinese Patent Application No. 201110241674.7.

(Continued)

*Primary Examiner* — Akwasi M Sarpong
(74) *Attorney, Agent, or Firm* — Cowan, Liebowitz & Latman, P.C.

(57) ABSTRACT

A print apparatus has a unit for printing input image data onto a print medium and printing a protection layer onto a print surface of the print medium on which the image data has been printed, a unit for inputting information different from the image data, and a control unit for controlling the printing of the protection layer by the print unit so that a portion where the protection layer is not printed indicates the input information.

17 Claims, 16 Drawing Sheets

(56) References Cited

U.S. PATENT DOCUMENTS

| | | | |
|---|---|---|---|
| 2003/0234847 A1* | 12/2003 | Takekoshi | B41J 2/335 347/102 |
| 2008/0055387 A1 | 3/2008 | Hirota | |
| 2008/0302259 A1 | 12/2008 | Katoh et al. | |
| 2013/0201269 A1* | 8/2013 | Hozumi | B41J 2/325 347/187 |

FOREIGN PATENT DOCUMENTS

| | | | |
|---|---|---|---|
| JP | 2002211017 | * | 7/2002 |
| JP | 2007-036467 A | | 2/2007 |
| JP | 2008-210046 A | | 9/2008 |
| JP | 2009-073034 | | 4/2009 |
| JP | 2009-073034 A | | 4/2009 |
| JP | 2009-118095 A | | 5/2009 |

OTHER PUBLICATIONS

The above foreign references were cited in a Jun. 3, 2014 Japanese Office Action, a copy of which is enclosed without an English Translation, that issued in Japanese Patent Application No. 2010-186774.

The above foreign patent documents were cited in a Sep. 25, 2014 Chinese Office Action, a copy of which is enclosed with an English Translation, that issued in Chinese Patent Application No. 201110241674.7.

* cited by examiner

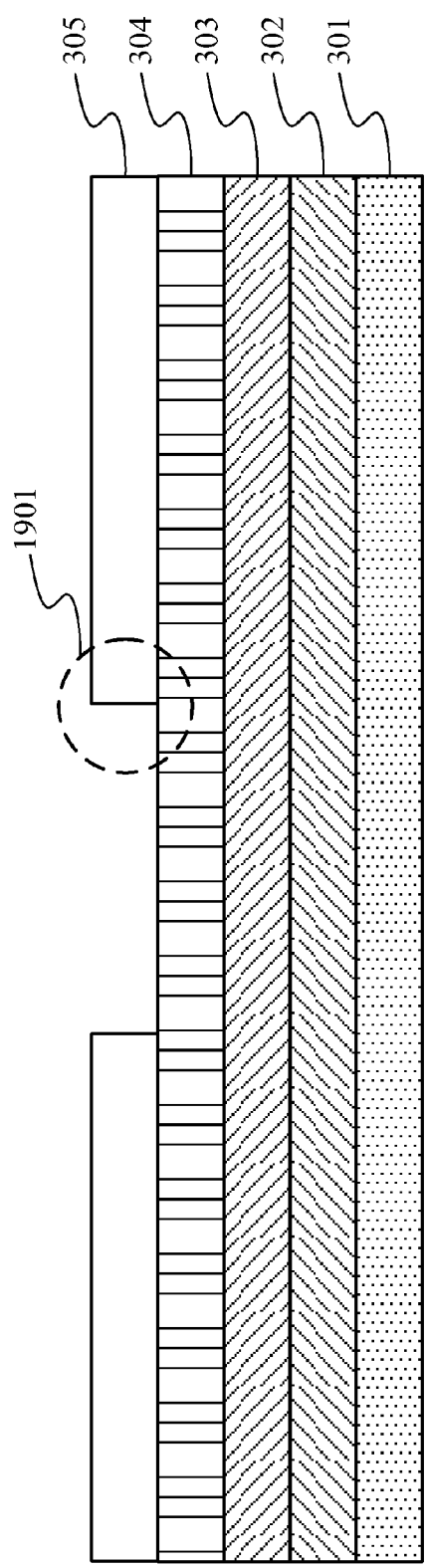
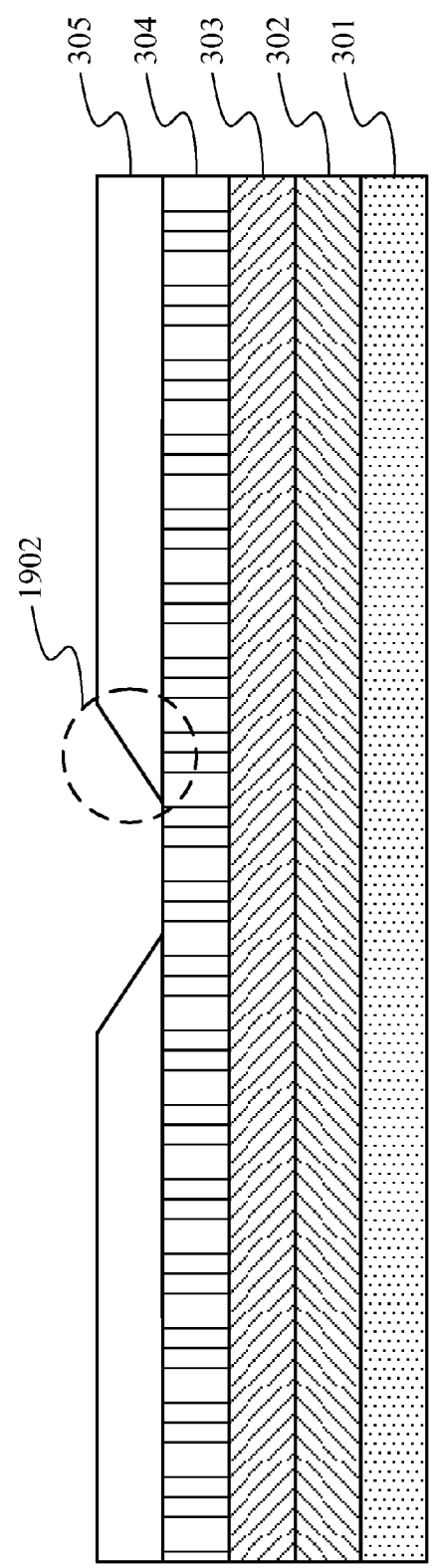

PRINT APPARATUS AND ITS CONTROL METHOD

BACKGROUND OF THE INVENTION

1. Field of the Invention

The present invention relates to a print apparatus, control method thereof, and a computer program and, more particularly, to a print control apparatus for printing an overcoating, which is applied to a print system of the print apparatus, its control method, and a computer program.

2. Description of the Related Art

Many print apparatuses each of which can print and output image data photographed by equipment such as digital still camera, digital video camera, or cellular phone having an image input unit have been manufactured as products.

A thermal transfer method can be mentioned as an example of a print system used in a photo print apparatus which is used to print and output image data of a photograph or the like photographed by such image input equipment.

According to the thermal transfer print apparatus, print paper having a dye receptible layer on its surface is used and a plurality of heat generators arranged in a main scanning direction of a thermal head are selectively driven, thereby allowing a dye layer of an ink sheet to be thermally transferred to the dye receptible layer of the print paper. At the same time, by feeding the print paper in a sub scanning direction of the thermal head, a dot-line printing is performed onto the print paper and an image is formed onto the print paper.

A dye sublimation type thermal transfer print apparatus is a printer of such a type that a dye which has changed a state thereof from a solid to a gas through sublimation is deposited onto the print paper. According to such a type, since a smooth and excellent gradational image can be expressed by controlling the number of times and an amount of heating a head and changing a concentration of one pixel, it is a system suitable for a print output of a photograph.

According to the thermal transfer print apparatus, an ink sheet (ink ribbon) having a construction illustrated in FIG. 2 is generally used. Sublimational dye layers for a yellow (Y) color 201, a magenta (M) color 202, and a cyan (C) color 203 for forming an image are sequentially arranged on a base member of the ink sheet. An overcoating layer (thermal fusible resinous material clear layer) 204 for protecting the image forming layer is finally arranged. Each detection marker 205 of a leading position of the ink sheet is arranged between the respective ink sheets of the colors and between the ink sheet and the overcoating layer 204. A construction of a feature-based ink sheet exclusively for monochrome image printing or the like is not limited to the construction mentioned above.

One image is formed by the dye layers of the three colors of Y, M, and C and the overcoating layer (protection layer). FIG. 3 is a conceptual diagram of a cross section of the print paper on which the image has been formed. A thermal transfer process is sequentially performed onto the print paper from a dye receptible layer 301 side of the print paper to a sublimational dye 302 for the yellow (Y) color, a sublimational dye 303 for the magenta (M) color, a sublimational dye 304 for the cyan (C) color, and an overcoating (OC) layer 305.

Since the image formed by the sublimational dye layers is protected by the overcoating layer, an abrasiveness is improved, a color fading appearing as time goes by is prevented, and a finishing with excellent durability and water-resistance can be realized.

Therefore, the layers of the Y/M/C colors and the OC layer are repeatedly arranged in the ink sheet in an ink sheet cartridge so that the number of times of repetition corresponds to the number of printable papers. Ordinarily, a length of ink sheet of the layers of the Y/M/C colors and the OC layer is set to such a length that an area having a size in a longitudinal direction of the print paper to be printed can be printed by the ink sheet.

In addition, there exists a print apparatus which is arranged such that when printing, a photographing time/date and arbitrary character information which is required by the user can be printed together into an image by settings of the print apparatus side exists. There is also another print apparatus having a function for expanding a variation of a print image so that a stamp and a graphic of a balloon shape are inserted as a pattern into an image.

However, when a printed matter is mailed as a postcard or the like, there may be a case where the user does wish to avoid such a situation that character information indicating personal information is read out by the third party other than a mail partner. On the other hand, such a function that character or symbol information is preliminarily concealed like a scratch printing and can be recognized as character or symbol information by the user's operation is demanded for a printed matter having a card size or the like, as expansion of a variation of the print image. On the contrary to such a demand, there is also such a demand that the user wishes to erase the unnecessary character information and graphic information.

For example, the Official Gazette of Japanese Patent Application Laid-Open No. 2009-073034 discloses such a technique that a coating amount of an overcoating layer for protecting a print image is increased or decreased so that information which is requested by the user is recorded to the print image in such a manner that no influence is exerted on a photographed image. Since a thickness of overcoating layer of a character information portion differs, a reflectance also differs, so that the user can recognize the character information portions when viewing aslant a printed matter.

However, to recognize the character information, it is necessary to confirm the printed matter while projecting light thereto at a place where there is light such as a fluorescent lamp or the like. Thus, there is a problem in terms of visibility under a dark environment. There is also a possibility that the character information is unintentionally read out by the third party.

SUMMARY OF THE INVENTION

The invention is made to solve the problems in the related arts mentioned above. That is, an aspect of the invention is to provide a print apparatus for printing a protection layer upon image printing, wherein character information, graphic information, or the like can be concealed from a print image. Another aspect of the invention is to provide a print apparatus which can erase unnecessary character information, graphic information or the like after the printing.

To accomplish the above object, according to the invention, a print apparatus for printing image data onto a print medium together with a protection layer, comprising: an image data input unit configured to input the image data; a print unit configured to print an image onto the print medium on the basis of the image data input by the image data input unit and print the protection layer onto a print surface of the print medium on which the image data has been printed; an information input unit configured to input information different from the image data; and a control unit configured to control the printing of the protection layer by the print unit such that a portion where the protection layer is not printed indicates the information input by the information input unit.

Further features of the present invention will become apparent from the following description of exemplary embodiments with reference to the attached drawings.

BRIEF DESCRIPTION OF THE DRAWINGS

FIGS. 19A and 19B are conceptual diagrams illustrating cross sections of print paper on which an image has been formed by a print apparatus according to the fourth embodiment of the invention.

DESCRIPTION OF THE EMBODIMENTS

Exemplary embodiments of the present invention will now be described in detail hereinbelow with reference to FIGS. 1 to 19B. An outline of a printer system according to the embodiment of the invention will be described with reference to FIGS. 1 to 19B.

Figure 4:
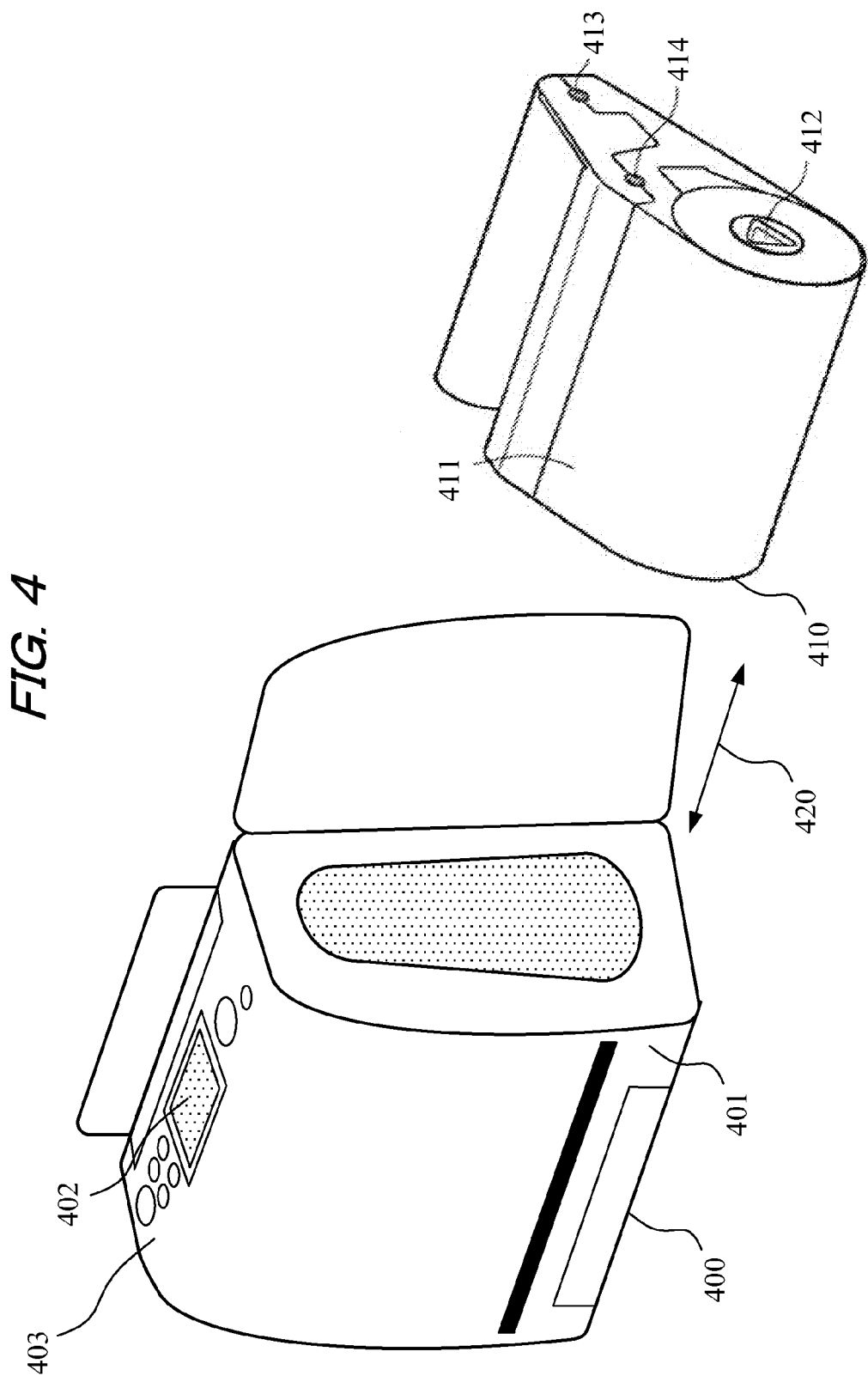
FIG. 4 is a constructional diagram illustrating an external appearance of the print apparatus according to each embodiment of the invention and a cartridge which is used in the print apparatus.

FIG. 4 is a diagram illustrating an external appearance construction of a print apparatus 400 according to the embodiment and a cartridge 410 which is used in the print apparatus 400.

As illustrated in FIG. 4, the print apparatus 400 has a housing 401 arranged such that a side surface is opened/closed and the cartridge 410 is detachable (loadable/ejectable) to/from the print apparatus in directions of arrows 420 shown in the diagram. A display unit 402 and an operation unit 403 are arranged in an upper portion of the housing 401. The display unit 402 for displaying a GUI is constructed by a display screen such as a liquid crystal display or the like and displays image data or a menu for inputting setting data necessary for printing. The operation unit 403 has various kinds of operation members illustrated in FIG. 7.

Figure 7:
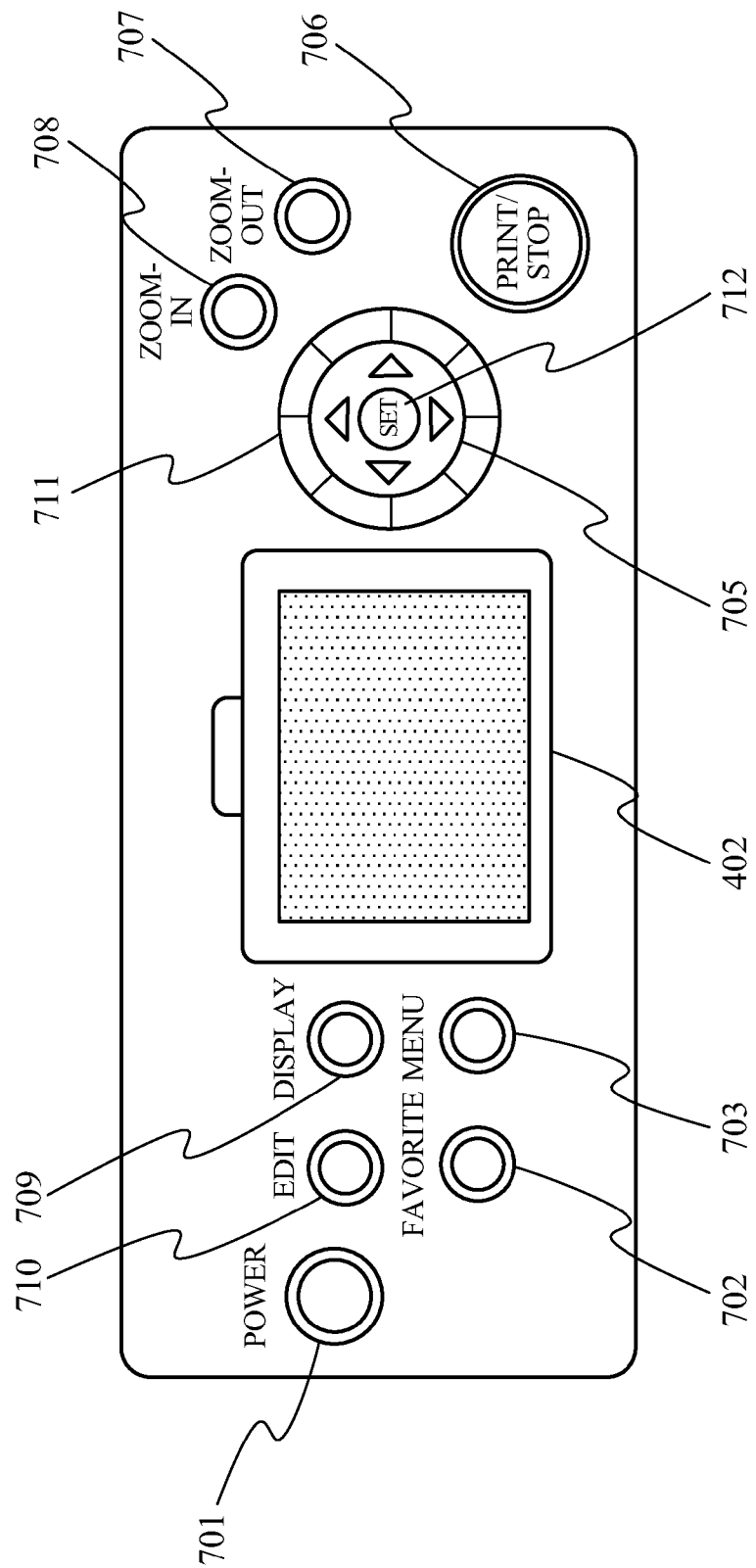
FIG. 7 is a diagram illustrating a construction of a display unit and operation members in the print apparatus according to one embodiment of the invention.

As illustrated in FIG. 7, a power button 701 for turning on/off a power source of the print apparatus and a print/stop button 706 for executing/stopping a print output are arranged in the operation unit. The power source is turned on by depressing the power button 701. Image data is selected by operating a four-way operational key 705. The selected image data is decided by depressing a SET button 712. The feeding operation of the image data, the scroll operation, or the menu selecting operation can be executed by rotating a jog dial 711.

The display screen can be transited to a number-of-print setting screen or a print medium (print paper) type setting screen by depressing a menu button 703. The display screen is transited to a trimming edit procedure screen of the image data by depressing an edit button 710. A trimming size of the image data is decided by operating a zoom-in button 708 and a zoom-out button 707. Information such as file name, photographing day, and image size of the image data is displayed by depressing a display button 709. A favorite button 702 is used to transit the display screen to a selection screen of an editing function such as calendar creation or multi-layout creation (a plurality of image data are arranged).

After completion of the selection of the image data to be printed and various kinds of settings, by depressing the print/stop button 706, a print process is started. When the user wants to stop the process after the start of the print process, the print/stop button 706 is depressed.

An ink sheet coated with ink and roll paper (belt-shaped recording medium winded up on a roller) serving as print paper have been enclosed in the cartridge 410. In a state before the cartridge 410 is loaded into the print apparatus 400, the roll paper is contained hermetically in a housing 411 and the user cannot directly touch the roll paper. Upon printing, the roll paper is picked up from the cartridge 410 and the ink coated on the ink sheet is transferred onto the roll paper by a thermal head of the print apparatus.

Figure 2:
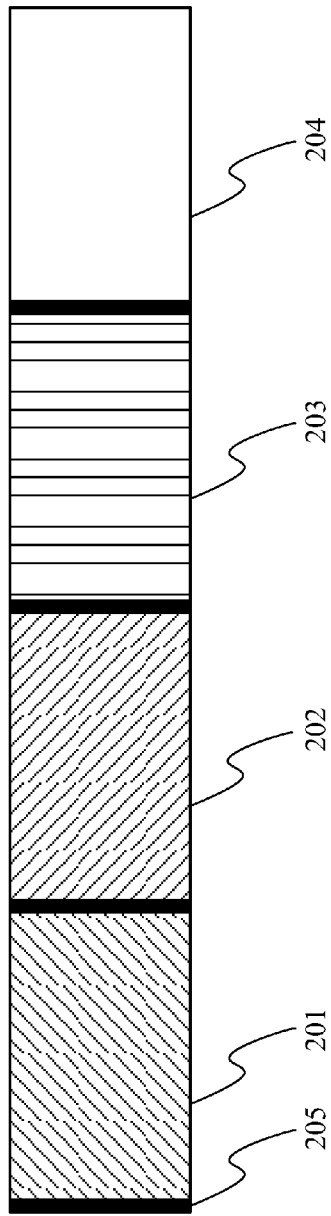
FIG. 2 is a diagram illustrating a construction of an ink sheet which is generally used in a thermal transfer print apparatus.

The ink sheet which is generally used in the print apparatus of the thermal transfer method is illustrated in FIG. 2. The sublimational dye layers 201 to 203 for yellow (Y), magenta (M), and cyan (C) for forming an image are sequentially arranged on the base member of the ink sheet. Subsequently, the overcoating layer 204 (thermal fusible resinous material clear layer) for protecting the image formed on the roll paper is arranged. The detection marker 205 of a leading position of the ink sheet is arranged between the respective ink sheets of the colors and between the ink sheet and the overcoating layer (the leading Y-color marker is shown by double line). However, a construction of the feature-based ink sheet exclusively for monochrome image printing or the like is not limited to the construction mentioned above.

In order to form one image, the thermal transfer process onto the print paper is sequentially executed on a unit basis of the dyes of three colors of Y, M, and C and the protecting ink such as an overcoating. Therefore, the layers of the Y, M, and C colors and the overcoating layer are repeatedly arranged in the ink sheet in the ink sheet cartridge so that the number of times of repetition corresponds to the number of printable papers.

In FIG. 4, the roll paper is winded up on a rotation axis 412 of a roller. When the cartridge 410 is loaded into the print apparatus 400, the rotation axis 412 is engaged with a rotation mechanism of a paper feed motor provided for the print apparatus 400. The rotation of the roller is controlled by the print apparatus 400. Reference numerals 413 and 414 denote a rotation axis 413 of a supply roller of the ink sheet and a rotation axis 414 of a wind-up roller of the ink sheet, respectively. When the cartridge 410 is loaded into the print apparatus 400, the rotation axis 414 of the wind-up roller is engaged with a rotation mechanism of an ink sheet winding motor 517 provided for the print apparatus 400. Thus, the rotation of the wind-up roller is controlled by the print apparatus 400.

Figure 5:
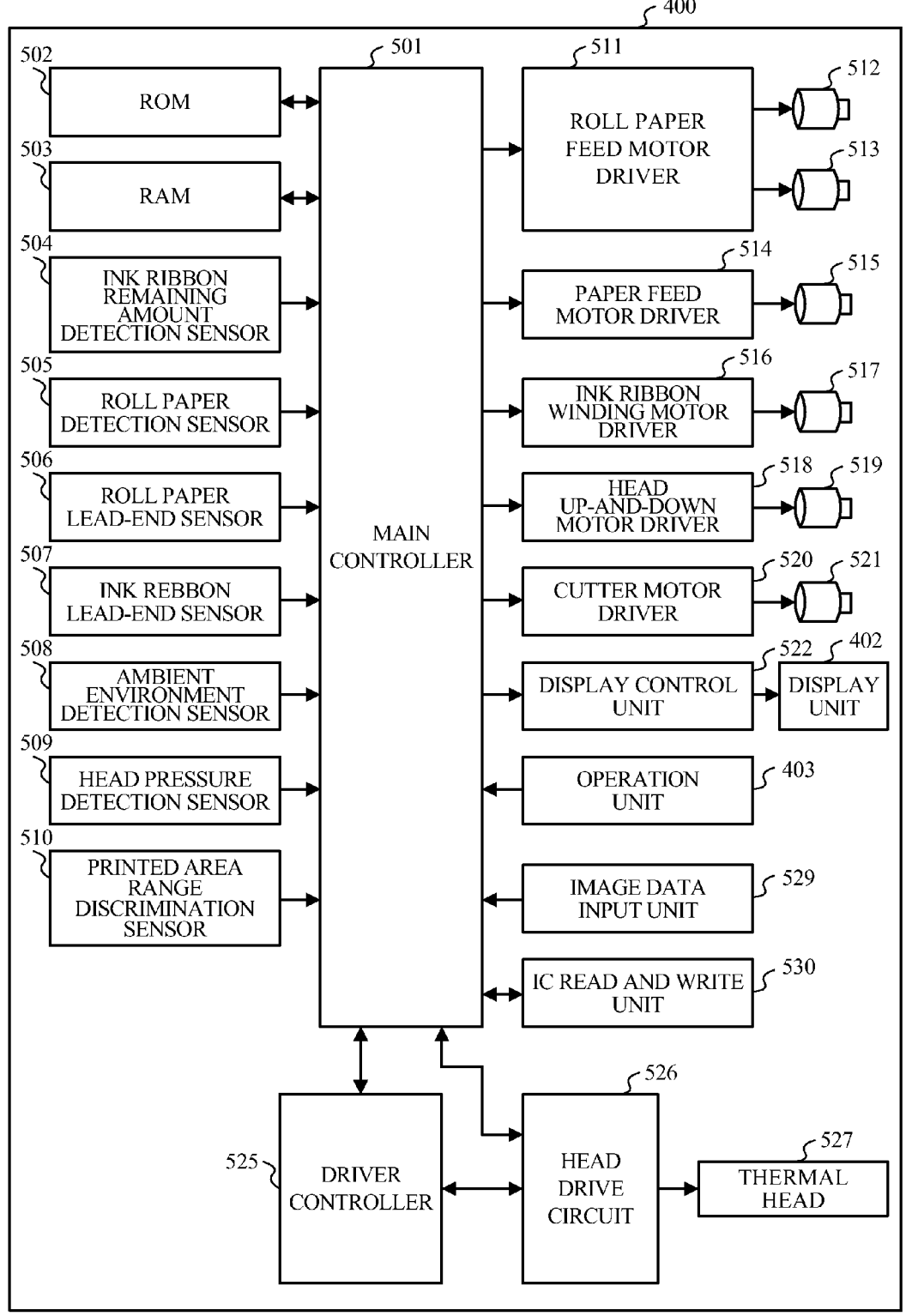
FIG. 5 is a block diagram illustrating a schematic construction of the print apparatus according to each embodiment of the invention.

FIG. 5 is a block diagram illustrating a functional construction of the print apparatus 400. A main controller 501 controls the whole print apparatus 400 and executes system control and an operation process according to various kinds of computer programs. The image data is subjected to a working process by the operation process of the main controller 501, thereby forming the image data necessary for the print process. A ROM 502 is connected to the main controller 501. A control program and the like are stored in the ROM 502. The main controller 501 operates in accordance with the control program stored in the ROM 502. A curl amount prediction table is stored in the ROM 502. The main controller 501 calculates a curl amount by executing an operation process. A RAM 503 is used as a work memory for the operation process of the main controller or a memory for storing print data. The RAM 503 is also used as a temporary storage memory of the various kinds of setting data and the like input through the operation unit 403.

An image data input unit 529 reads out the image data from a memory card inserted in a card slot arranged on the print apparatus 400. The image data can be also obtained by connecting a USB A connector terminal (not shown) serving as an input/output I/F (interface) of the print apparatus 400 and a USB mini-B connector terminal (not shown) of a digital camera by a cable. In this case, the print apparatus side functions as a host apparatus and the print operation can be executed from the digital camera side. Subsequently, by connecting a USB B connector terminal serving as an input/output I/F of the print apparatus and a PC (Personal Computer), the print apparatus side functions as a device apparatus and the print operation can be also executed from the PC side.

In a thermal head 527, heat generators (not shown) arranged in the main scanning direction generates heat, thereby sublimating the ink coated on the ink sheet so as to be deposited onto the roll paper. A head drive circuit 526 drives the heat generators built in the thermal head 527. A driver controller 525 connected to the main controller 501 controls the head drive circuit 526 by using the image data recorded in a bit map format in the RAM 503, thereby performing the printing. A maximum gradation value of the data in the bit map format is equal to 225. A gradation value of the image data upon overcoating printing is equal to 170.

A roll paper feed motor driver 511 drives drive motors 512 and 513. The drive motors 512 and 513 are engaged with a curl correction roller, a grip roller, a paper discharge roller, a paper ejection roller, and the like, which will be described hereinafter, through the rotation mechanism. The roll paper is fed by driving those rollers.

A paper feed motor driver 514 controls a rotation of a paper feed motor 515. In a state where the cartridge 410 is loaded, the paper feed motor 515 is engaged with the roller 412 serving as a rotation axis of the roll paper unit, through the rotation mechanism. The rotation of the roller 412 is controlled by the paper feed motor driver 514.

An ink sheet winding motor driver 516 controls a rotation of the ink sheet winding motor 517. In a state where the cartridge 410 is loaded, since the wind-up roller 414 of the ink sheet and the ink sheet winding motor 517 are engaged through the rotation mechanism, the wind-up and the winding of the ink sheet are controlled by the ink sheet winding motor driver 516.

A head up-and-down motor driver 518 controls a rotation of a head up-and-down motor 519 for elevating up/down the thermal head 527, thereby making the thermal head 527 operative between a print position and a withdrawal position.

A cutter motor driver 520 controls a cutter motor 521 for driving a cutter blade and a cutter reception blade constructing a cutter unit, thereby cutting the roll paper.

An ink sheet remaining amount detection sensor 504 detects a rotational speed at the time of the sheet wind-up operation. A remaining amount of the roll paper winded up on the roller is detected from the rotational speed. When the remaining amount of the roll paper is running out, a message showing that the remaining amount is small is displayed on the display unit 402.

A roll paper detection sensor 505 detects a state where the roll paper arranged in the cartridge 410 is pushed out and its leading portion is output from an output of the cartridge. The roll paper detection sensor 505 is arranged oppositely to a latitudinal direction of the roll paper so as to be located near the output of the cartridge. The roll paper detection sensor 505 detects a right edge portion and a left edge portion in the latitudinal direction of the roll paper pushed out from the cartridge output, respectively. On the basis of a difference between respective detection timings of the edge portions of the roll paper by the roll paper detection sensor 505, the print apparatus 400 can recognize a slant in the latitudinal direction of the roll paper pushed out from the cartridge output.

A roll paper lead-end sensor 506 is arranged behind a platen roller provided oppositely to the thermal head 527. When the printing is started, the roll paper lead-end sensor 506 detects that the leading portion of the roll paper picked up from the cartridge 410 passes through a position behind the platen roller.

An ink sheet lead-end sensor 507 detects an identification zone coated on the leading portion of each color of the ink sheet. The winding operation of the ink sheet by the ink sheet winding motor 517 is controlled based on a detection result of the ink sheet lead-end sensor 507.

An ambient environment detection sensor 508 detects a temperature and a moisture of the environment where the print apparatus 400 is disposed. An energy which is applied to the thermal head 527 by the head drive circuit 526 is controlled on the basis of a temperature detection result obtained by the ambient environment detection sensor 508. In a curl amount prediction, the temperature/moisture detection results obtained by the ambient environment detection sensor 508 are used as parameters.

A head pressure detection sensor 509 detects a head pressure at the time when the thermal head 527 descends to the print position upon printing and depresses the ink sheet and the roll paper between the thermal head and the platen roller. A printed area range discrimination sensor 510 is arranged near the cutter unit and discriminates the printed area range.

A display control unit 522 controls such that the image data to be printed and a GUI display screen for making the setting necessary to print are displayed to the display unit 402. An IC read and write unit 530 reads out information from a cartridge information chip (IC) arranged in the cartridge 410 and writes information into the IC. As information which is read out of the IC, for example, there are: a size (width, thickness, length) of roll paper; characteristics of the roll paper; a diameter of the roller; information of manufacturing year/month/day; information of characteristics of the ink sheet; a diameter of the wind-up roller of the ink sheet; a diameter of the supply roller of the ink sheet; and the like. As information which is written into the IC, for example, there are: information of the number of printed papers; information of the number of erroneously printed papers; information of print failure factors; and the like.

Figure 6:
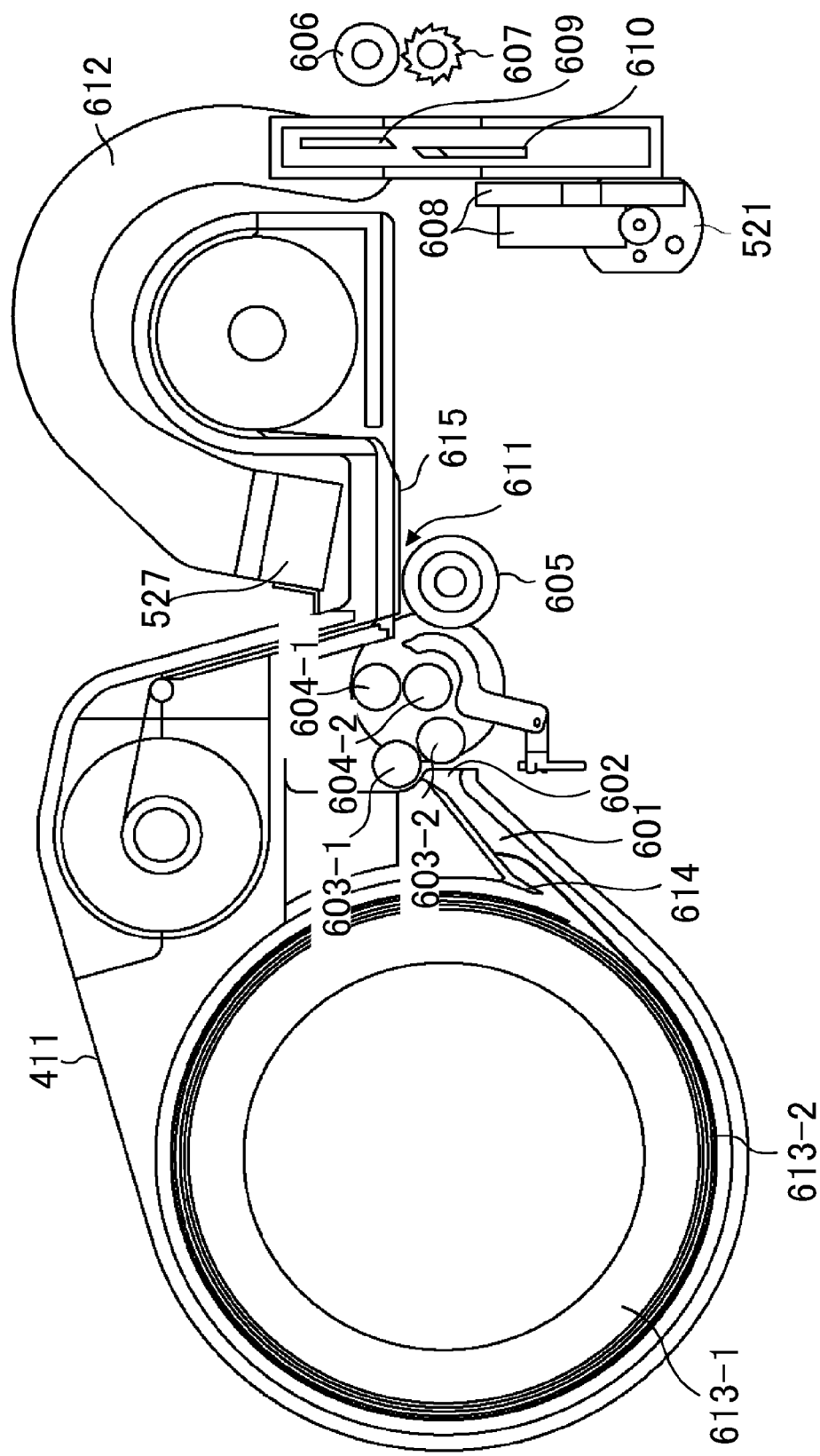
FIG. 6 is a side sectional view of the print apparatus according to each embodiment of the invention, in the case where the cartridge is loaded in the print apparatus.

FIG. 6 is a cross sectional view in the case where the cartridge 410 is loaded in the print apparatus 400 is seen from the side surface of the print apparatus 400. A construction of each unit which operates when the print apparatus 400 executes the print process will be simply described. In the above description, component elements similar to the component elements which have already been described above are denoted by the same reference numerals and their description is omitted here.

In FIG. 6, when roll paper 613-2 contained in the cartridge 410 is picked up to a print position 611 upon printing, the roll paper passes through a feeding path 601. A cartridge output 602 is provided. The roll paper 613-2 winded on a roller 613-1 is ripped off by an isolation member 614, so that it is pulled out to an outside of the cartridge 410 from the cartridge output 602 and passes through the feeding path 601.

A curl correction roller 603-1 and a curl correction driven roller 603-2 are provided to correct a curl of the roll paper 613-2. A pinch roller 604-1 and a grip roller 604-2 are arranged oppositely to each other so that the roll paper 613-2 passes therebetween with being held on the front surface and the back surface thereon, respectively. When the pair of rollers rotate clockwise (when the pinch roller 604-1 rotates toward the left on the paper surface), the roll paper 613-2 picked up from the cartridge 410 is fed toward the print position 611.

In the state where the cartridge 410 is loaded in the print apparatus 400, a housing of the cartridge 410 which covers an ink sheet 615 is removed at the position corresponding to the print position 611. In this state, the ink sheet 615 is exposed to the outside of the cartridge 410.

A platen roller 605 holds the ink sheet 615 and the roll paper 613-2 with being put together at the print position 611 between the platen roller 605 and the thermal head 527. A head position specifying member 612 is interlocked with a control mechanism of the head up-and-down motor 519 for elevating up/down the thermal head 527.

A paper discharge roller 606 feeds the roll paper 613-2 in a paper discharge direction. A paper ejection roller 607 having concave and convex portions thereon ejects the roll paper 613-2 which was cut after the printing, to a print paper stack, which will be described hereinafter. The paper discharge roller 606 and the paper ejection roller 607 are arranged oppositely to each other so that the roll paper 613-2 passes therebetween with being held on the front surface and the back surface thereon, respectively.

A gear train 608 transfers the operation of the cutter motor 521 to the cutter unit. A cutter blade 609 and a cutter reception blade 610 construct the cutter unit and are arranged oppositely to each other via the feeding path of the roll paper 613-2. The cutter blade 609 and the cutter reception blade 610 are driven by the gear train 608 and upper and lower blades are ground like scissors, thereby cutting the roll paper 613-2.

In FIG. 6, the roll paper 613-2 is in a state where the leading portion of the roll paper 613-2 is ripped off by the isolation member 614 and it remains on the feeding path 601. However, in the print apparatus 400, such a state is not always realized just after the cartridge 410 is loaded in the print apparatus 400. The print paper which is cut by the cutter unit is fed out from a paper discharge port by the paper discharge roller 606 and the paper ejection roller 607.

Although not illustrated in the block diagram of FIG. 5, the print apparatus has therein a power source circuit for supplying an electric power which is necessary for the operation, a circuit board on which various kinds of ICs and electric elements are mounted, and the like.

As mentioned above, according to the print apparatus of the invention, the image data is input, the input image data is printed onto the print medium, and the protection is printed onto the print surface of the print medium on which the image data has been printed.

Embodiment 1

Figure 8:
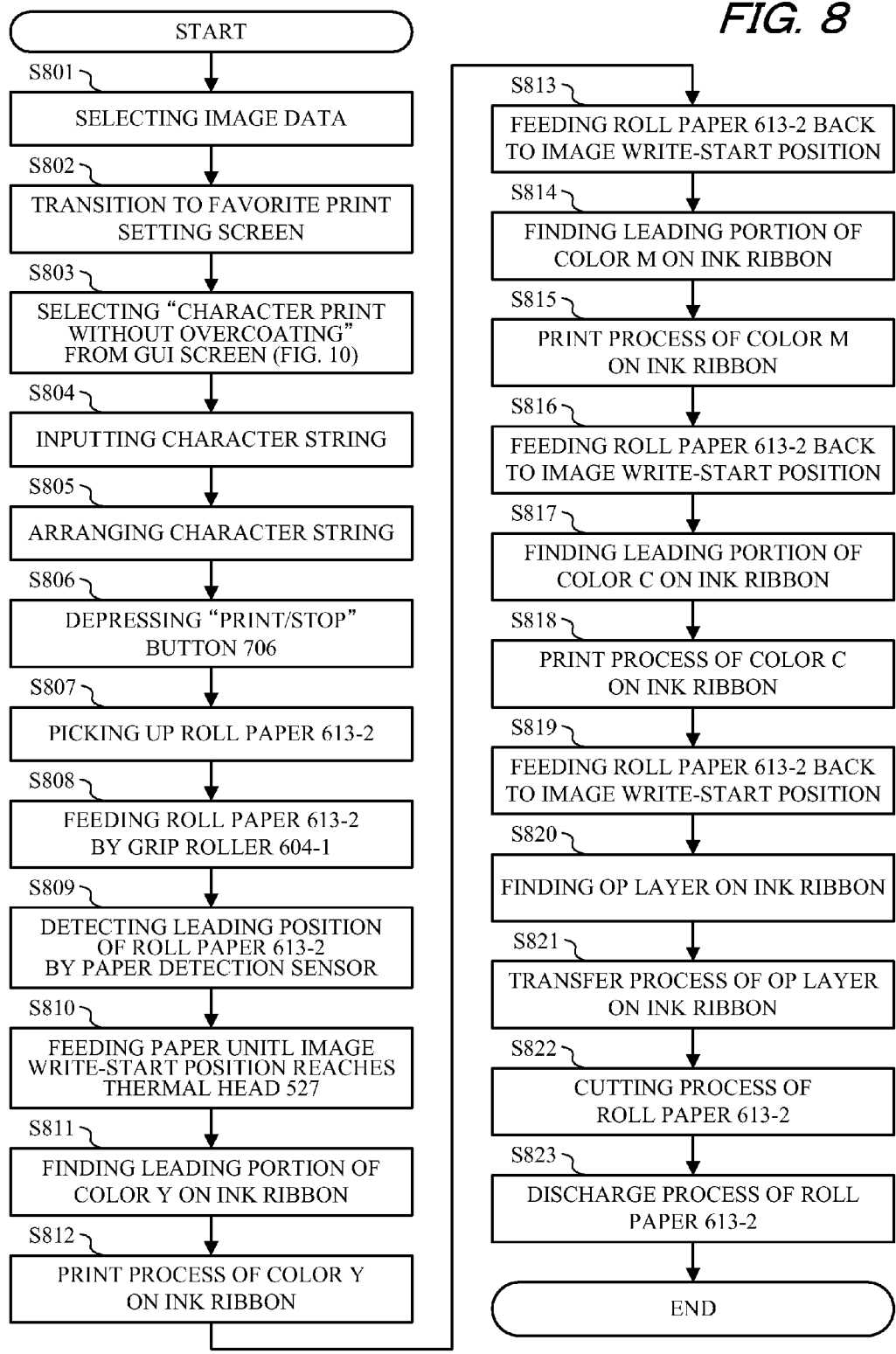
FIG. 8 is a flowchart illustrating a processing procedure of the print apparatus according to the first embodiment of the invention.
Figure 9:
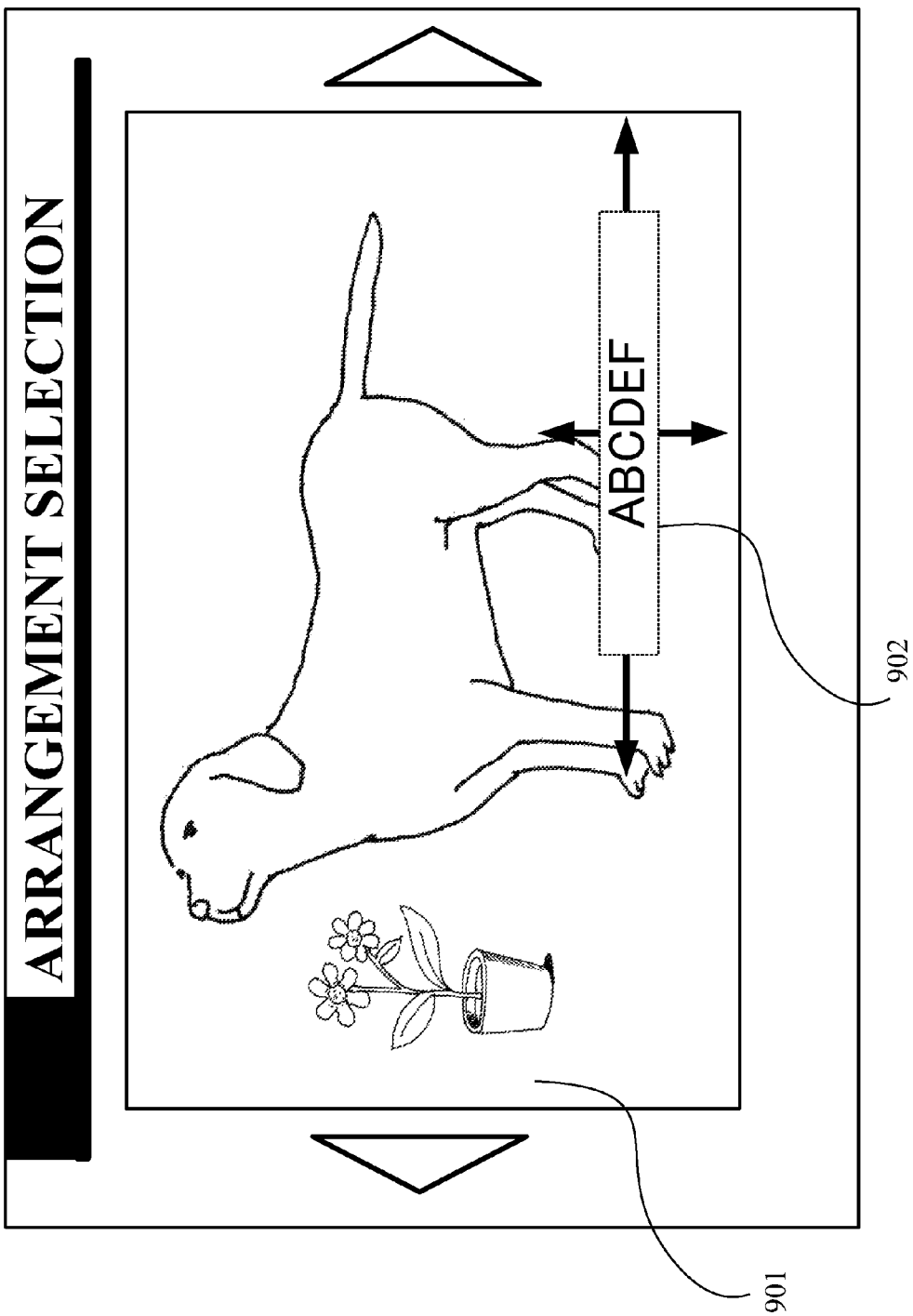
FIG. 9 is a diagram illustrating a display example of a GUI (Graphical User Interface) of the print apparatus according to the first embodiment of the invention.
Figure 10:
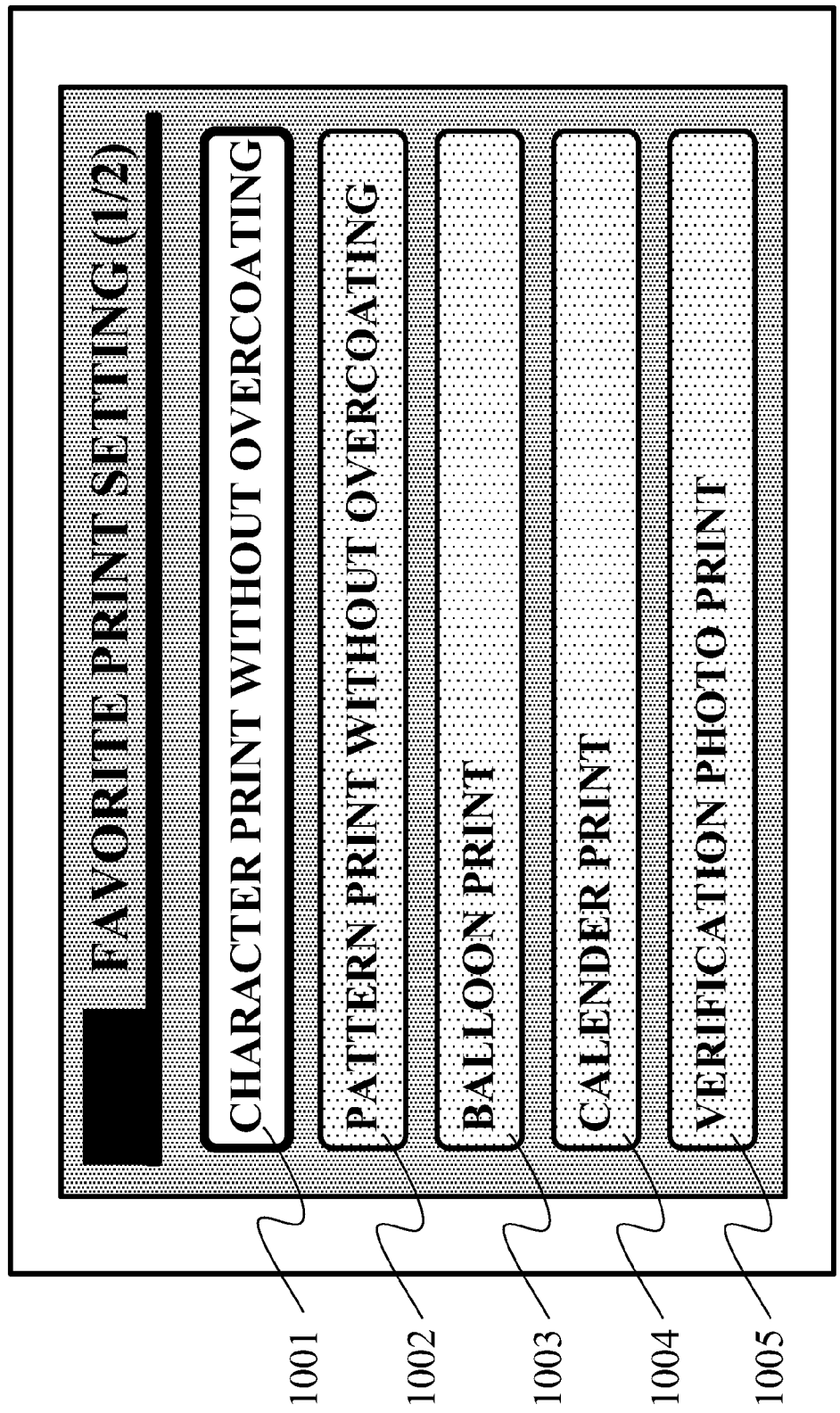
FIG. 10 is a diagram illustrating a display example of the GUI of the print apparatus according to the first embodiment of the invention.
Figure 11:
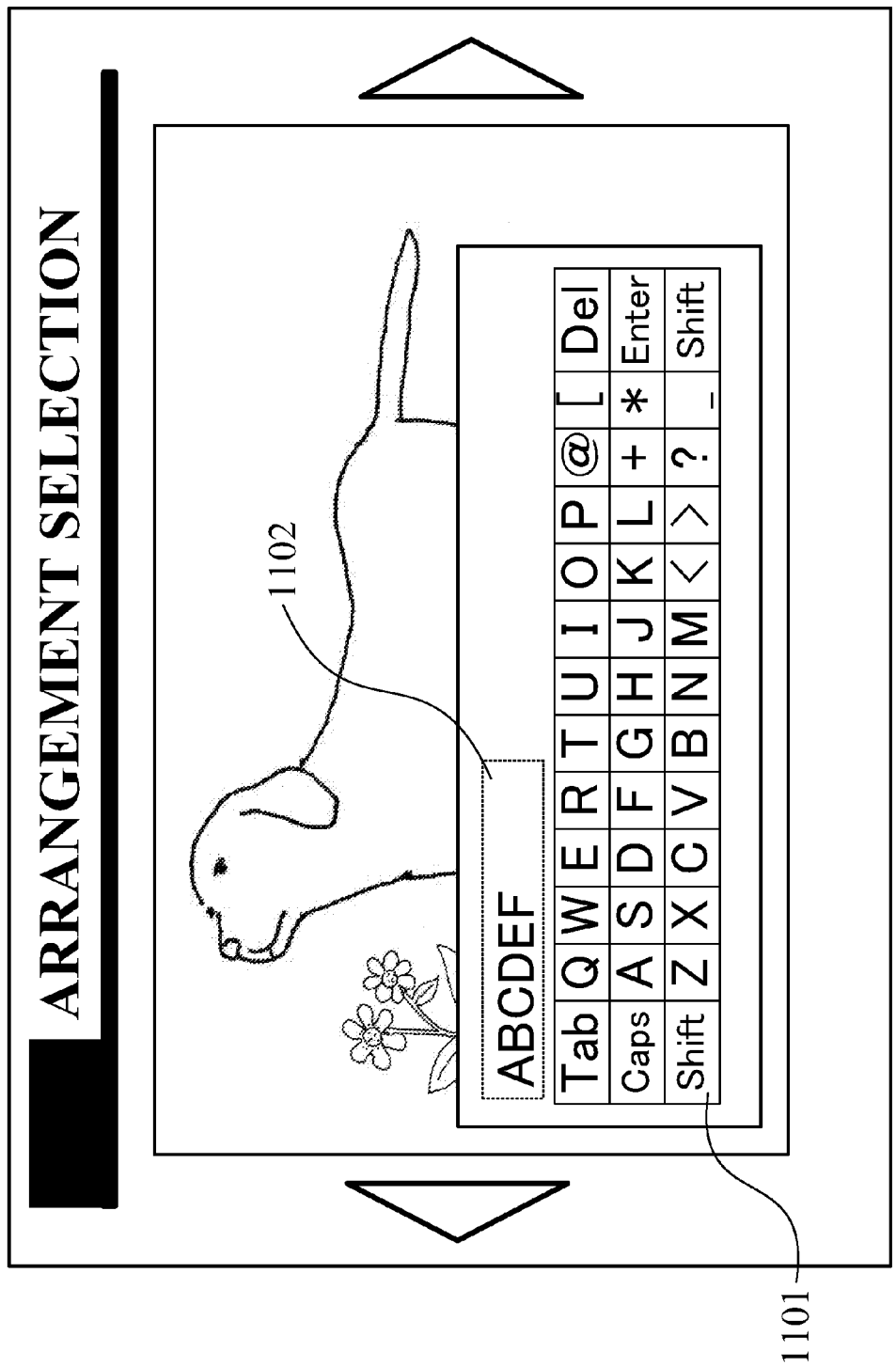
FIG. 11 is a diagram illustrating a display example of the GUI of the print apparatus according to the first embodiment of the invention.

A print setting and the print processing operation of the print apparatus according to the first embodiment of the invention will be described in detail hereinbelow with reference to a flowchart. FIG. 8 is a flowchart illustrating a print processing procedure of the print apparatus according to the first embodiment. FIGS. 9 to 11 are display examples of a GUI of the display unit 402 when processes shown in the flowchart of FIG. 8 are executed. The flowchart of FIG. 8 and the display of the GUIs in FIGS. 9 to 11 can be realized by a method whereby the main controller 501 operate in accordance with a computer program stored in the ROM 502.

When a print setting of a menu display screen (not shown) serving as a GUI displayed on the display unit 402 is selected by operating the four-way operational key 705 and the SET button 712, the image data is read out by the image data input unit 529. The read-out image data is displayed as a list of thumbnails onto the display unit 402. Subsequently, image data 901 serving as a print target is selected from the displayed image data list by operating the four-way operational key 705 as an operation member (step S801). Subsequently, by depressing the favorite button 702, the display screen is transited to a favorite print setting screen of FIG. 10 (step S802). Subsequently, "character print without overcoating 1001" is selected by operating the four-way operational key 705 and the SET button 712 is depressed (step S803).

Subsequently, in order to allow the user to input a desired character string area 902, the display screen is transited to a character input screen (information input) illustrated in FIG. 11. Character to be input are selected (manual selection) by depressing the four-way operational key 705 on a software keyboard screen 1101 and a character string which was input to a character input field 1102 is displayed by depressing the SET button 712 (step S804). After completion of the input of the character string, a position of the character string area 902 which is arranged in the image data 901 is decided by depressing the four-way operational key 705 on an arrangement selection screen illustrated in FIG. 9 (step S805). After completion of the print setting, the print/stop button 706 is depressed (manual selection) (step S806).

When the paper feed motor 515 rotates, the roll paper 613-2 is picked up and fed to the pinch roller 604-1 and the grip roller 604-2 (step S807). The subsequent print paper feeding is executed by the grip roller 604-2 which is driven by the drive motors 512 and 513 which are stepper motors (step S808). The drive motors 512 and 513 rotate by the number of turns as many as the number of steps of a pulse signal which is supplied from the roll paper feed motor driver 511. After the leading position of the print paper is detected, the position control is made by an open loop.

The leading position of the print paper fed by the grip roller 604-2 is detected by the roll paper detection sensor 505 (step S809). The print paper feeding is executed by a distance corresponding to the predetermined number of steps until a write position of the image of the roll paper 613-2 reaches the position of the thermal head 527 (step S810). Subsequently, a rotation of the rotation axis 414 of the wind-up roller of the ink sheet is controlled, thereby finding a leading portion of the ink sheet of the Y color. A detection marker of the leading portion of the ink sheet of the Y color is detected by a detection sensor of the marker 205 of the leading portion of the ink sheet of the Y color (step S811). After completion of the finding of the leading portion of the ink sheet of the Y color, the thermal head 527 which has been withdrawn during the print paper feeding and the operation to find the leading portion of the ink sheet is come into pressure contact with the platen roller 605 so as to sandwich the roll paper 613-2 and the ink sheet 615.

The image data is read out of the image data input unit 529 and the print data of the Y color ink is formed in the RAM 503 by the process of the main controller 501. The formed print data is transferred to the head drive circuit 526 for controlling the thermal head 527. The heat generators arranged in the thermal head 527 are made to generate the heat by energization of a head control signal. Since the ink sheet is heated, the dye is sublimated and fixed onto the roll paper 613-2 which is in contact with the ink sheet. The print process is executed one line by one. The grip roller 604-2 feeds the print paper synchronously with the energizing process of the thermal head 527, thereby forming an image (step S812). By the process of this step, a sublimational dye layer for the yellow (Y) color is formed onto the dye receptible layer of the print paper.

After completion of the print process of the Y color, the thermal head 527 is withdrawn. The grip roller 604-2 is rotated in the direction opposite to that in the case of the print process, thereby returning the roll paper 613-2 until an image write-start position of the first face of the image of the roll paper 613-2 reaches the position of the heat generators of the thermal head 527 (step S813).

In a manner similar to step S811, the rotation of the rotation axis 414 of the wind-up roller of the ink sheet is controlled, thereby detecting the marker of the ink sheet of the M color and finding a leading portion thereof (step S814). In a manner similar to step S812, the print process is executed by the ink sheet of the M color so as to overlap with the image formed in the Y color (step S815). After the print process, in a manner similar to step S813, the roll paper 613-2 is returned up to the write-start position of the image (step S816). A sublimational dye layer for the magenta (M) color is formed in this step. Until print processing steps S817 to S819 of the C color, processes similar to the print processing steps S814 to S816 of the M color are executed, thereby forming the image onto the dye receptible layer of the roll paper 613-2. A sublimational dye layer for the cyan (C) color is formed in this step.

After completion of the print processes of the color ink of Y, M, and C, a process for transferring the overcoating onto the print paper on which the image has been formed by transferring the color ink of Y, M, and C is executed. First, the ink sheet is winded up and a leading portion of the overcoating portion is found (step S820). By the process of the main controller 501, data for overcoating printing in which a gradation value of the character string area 902 is equal to 0 and gradation values of portions other than the character string area 902 are equal to 170 is formed in the RAM 503. The formed print data is transferred to the head drive circuit 526 for controlling the thermal head 527. The heat generators arranged in the thermal head 527 are made to generate the heat by energization of the head control signal. Since the heat generators of the thermal head 527 generate the heat, a protection layer in which the resinous material clear layer (overcoating) is transparent is formed on the surface of the print paper on which the image has been formed by transferring the ink of the respective colors in S812, S815, and S818 (step S821).

After that, the thermal head 527 is withdrawn. The grip roller 604-2 is rotated in the same direction as that in the case of the print process, thereby feeding the roll paper 613-2 until a cutting position of the roll paper 613-2 reaches the position of the cutter blade 609 serving as a print paper cutting mechanism, and the cutter blade 609 is driven to thereby cut the print paper (step S822).

The cut print paper is sandwiched between the paper discharge roller 606 and the paper ejection roller 607 and rotated in the paper discharge direction by the driving forces of the drive motors 512 and 513, thereby discharging the printed print paper to the outside of the print apparatus (step S823). In this manner, the print process of one sheet of image data is completed.

Figure 3:
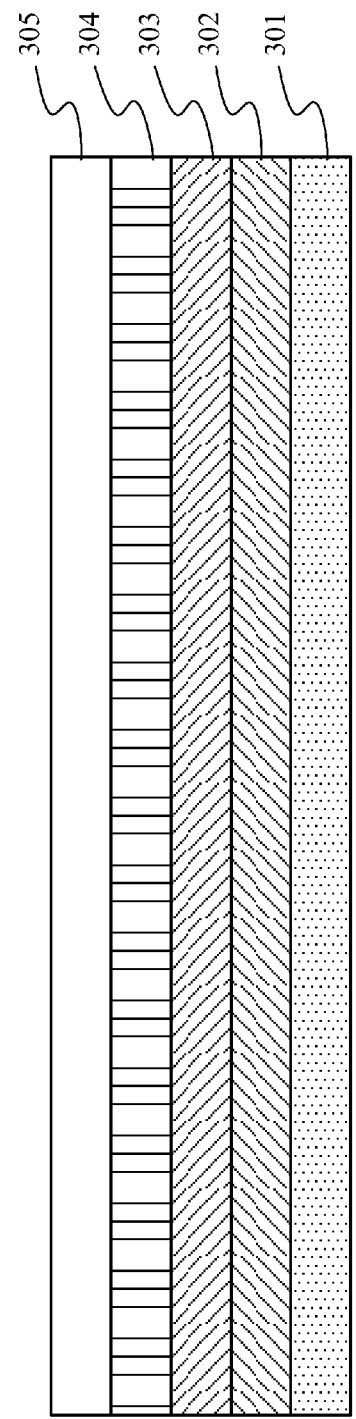
FIG. 3 is a conceptual diagram illustrating a cross section of the print paper on which an image has been formed by the thermal transfer print apparatus.
Figure 12:
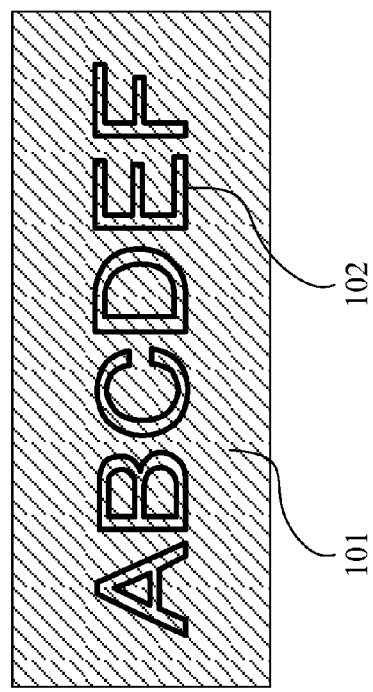
FIG. 12 is a schematic diagram illustrating a print surface of the print paper on which a character string has been printed by the print apparatus according to the first embodiment of the invention.

By the foregoing print process, the portions other than the character string area 902 become an overcoating print area 101. The overcoating print area 101 and an overcoating non-print area 102 are formed the character string area 902 as illustrated in FIG. 12. In the overcoating print area 101, as illustrated in FIG. 3, the sublimational dye 302 for the yellow (Y) color, sublimational dye 303 for the magenta (M) color, and sublimational dye 304 for the cyan (C) color are sequentially formed on the dye receptible layer 301, and the overcoating layer 305 is further formed on the sublimational dye 304 for the cyan (C) color. Therefore, the dyes are protected by the overcoating layer 305. Even if the print surface of the print paper is scraped, the dyes are not removed from the dye receptible layer 301.

Figure 1:
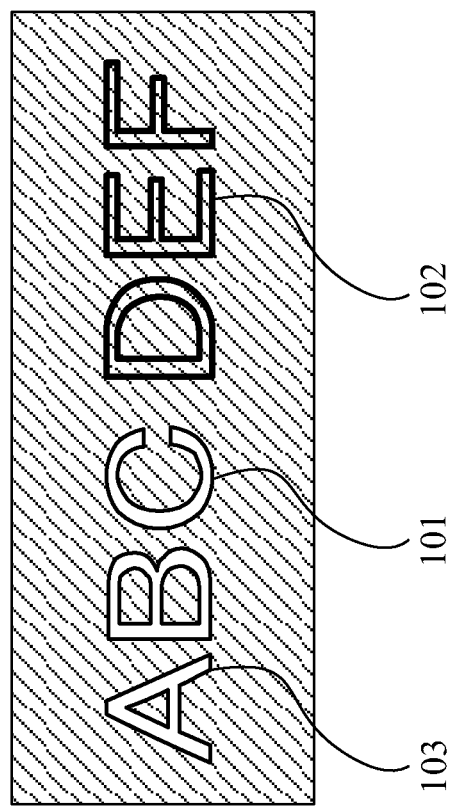
FIG. 1 is a diagram illustrating a print surface of print paper at the time when a character string is printed by a print apparatus according to the first embodiment of the invention.
Figure 13:
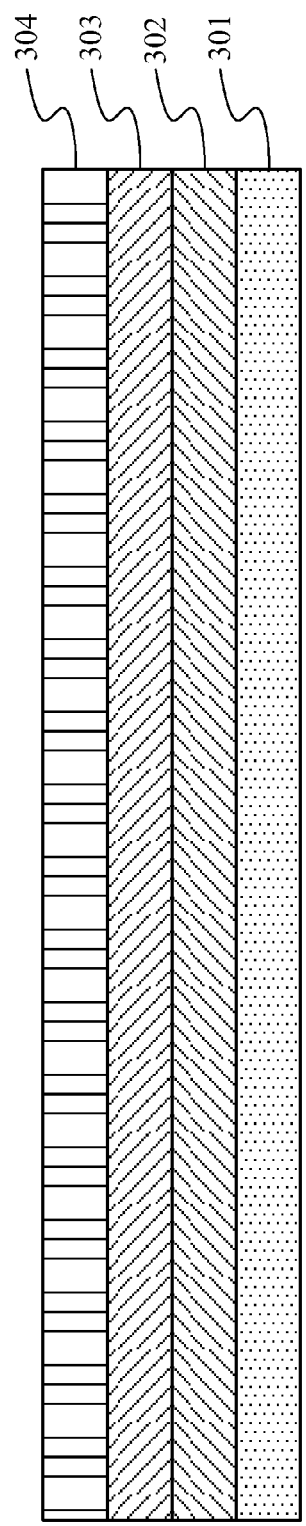
FIG. 13 is a conceptual diagram illustrating a cross section of the print paper on which a graphic has been printed by the print apparatus according to the first embodiment of the invention.

On the other hand, in the overcoating non-print area 102, as illustrated in FIG. 13, the sublimational dye 302 for the yellow (Y) color, sublimational dye 303 for the magenta (M) color, and sublimational dye 304 for the cyan (C) color are sequentially formed on the dye receptible layer 301, and no protection layer is formed on the sublimational dye 304 for the cyan (C) color. Therefore, if the print surface of the print paper is scraped by a character erasing, a finger, or the like, the dye layers are removed from the dye receptible layer 301. For example, if the user scrapes a part of the overcoating non-print area 102 by using an eraser or the like, the dyes are removed from the dye receptible layer 301 and a dye removal overcoating non-print area 103 is formed as illustrated in FIG. 1. According to the dye removal overcoating non-print area 103, since a ground color (white or the like) of the print paper is seen, the character string can be recognized. However, if the dyes are not removed from the dye receptible layer 301, since the dyes form the image, it is difficult to visually recognize a boundary surface between the overcoating print area 101 and the overcoating non-print area 102 and it is also difficult to discriminate the character string area 902.

Figure 15:
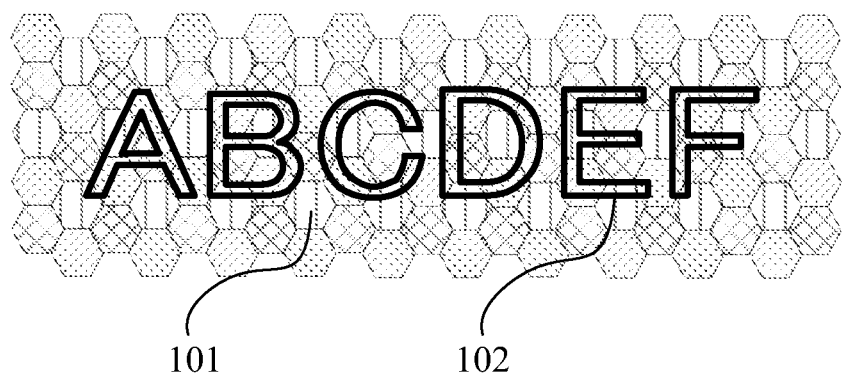
FIG. 15 is a diagram illustrating the print surface of the print paper on which a lattice pattern has been printed on a character string and its background portion by the print apparatus according to the first embodiment of the invention.

A process for setting the image of the character string area 902 into a lattice (block) pattern or a gradation pattern may be also added as illustrated in FIG. 15. By this process, the boundary between the overcoating print area 101 and the overcoating non-print area 102 can be made more difficult to be discriminated and a concealability can be raised.

Figure 14:
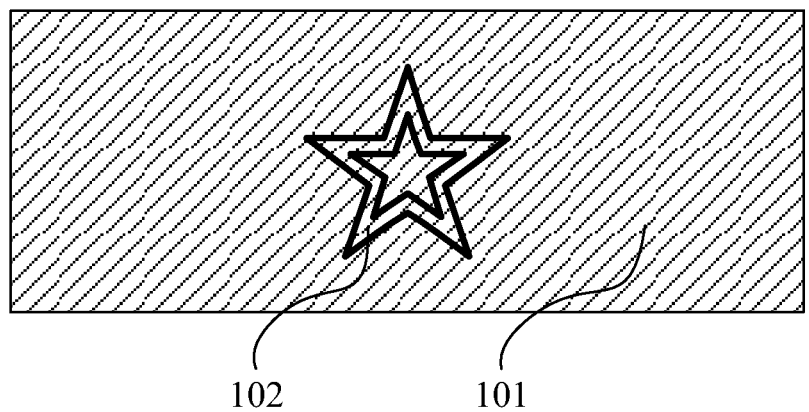
FIG. 14 is a diagram illustrating the print surface of the print paper on which a graphic has been printed by the print apparatus according to the first embodiment of the invention.

Although the character portion of the character string area 902 is formed as an overcoating non-print area 102 in the embodiment, as illustrated in FIG. 14, a graphic such as a star or the like or a symbol can be also formed as an overcoating non-print area 102. The graphic or symbol may be selected from selection candidates which are displayed on the display unit 402 or the user may form and set an arbitrary shape.

According to the invention as mentioned above, character information, graphic information, or the like is printed at an arbitrary desired position of the user as an area where no overcoating is printed onto the print image, thereby enabling the character information, graphic information, or the like to be concealed into the print image. The concealed information can be also easily visualized by scraping the print surface of the print paper by using the eraser or the like.

In the embodiment, in S805, the position of the character information, graphic information, or the like which is printed as an area where the overcoating is not printed can be set into an arbitrary area of the image data by the user. However, in the case of visualizing the character information or graphic information which is printed as an area where the overcoating is not printed, since such information becomes the ground color of the print paper, the character information or graphic information becomes difficult to be visualized in an area of a color close to the ground color of the print paper in the image data which is printed. Therefore, when the user is allowed to set the position where the character information or graphic information is printed, the positions where the information can be arranged may be restricted so that the character information or graphic information cannot be arranged in the area in the image data corresponding to the color close to the ground color of the print paper. For example, when the color of the paper is white, it is also possible to arrange the print apparatus in such a manner that a concentration of the image data is analyzed and the arrangement of the character information or graphic information is inhibited to an area of the image data having a concentration lower than a threshold value which has been preset in the print apparatus or an area where a predetermined amount or more of pixels having concentrations lower than the threshold value exist. It is also possible to arrange the print apparatus in such a manner that the arrangement is not inhibited but a warning showing that it becomes difficult to visualize is displayed or notified to the user.

Embodiment 2

Figure 16:
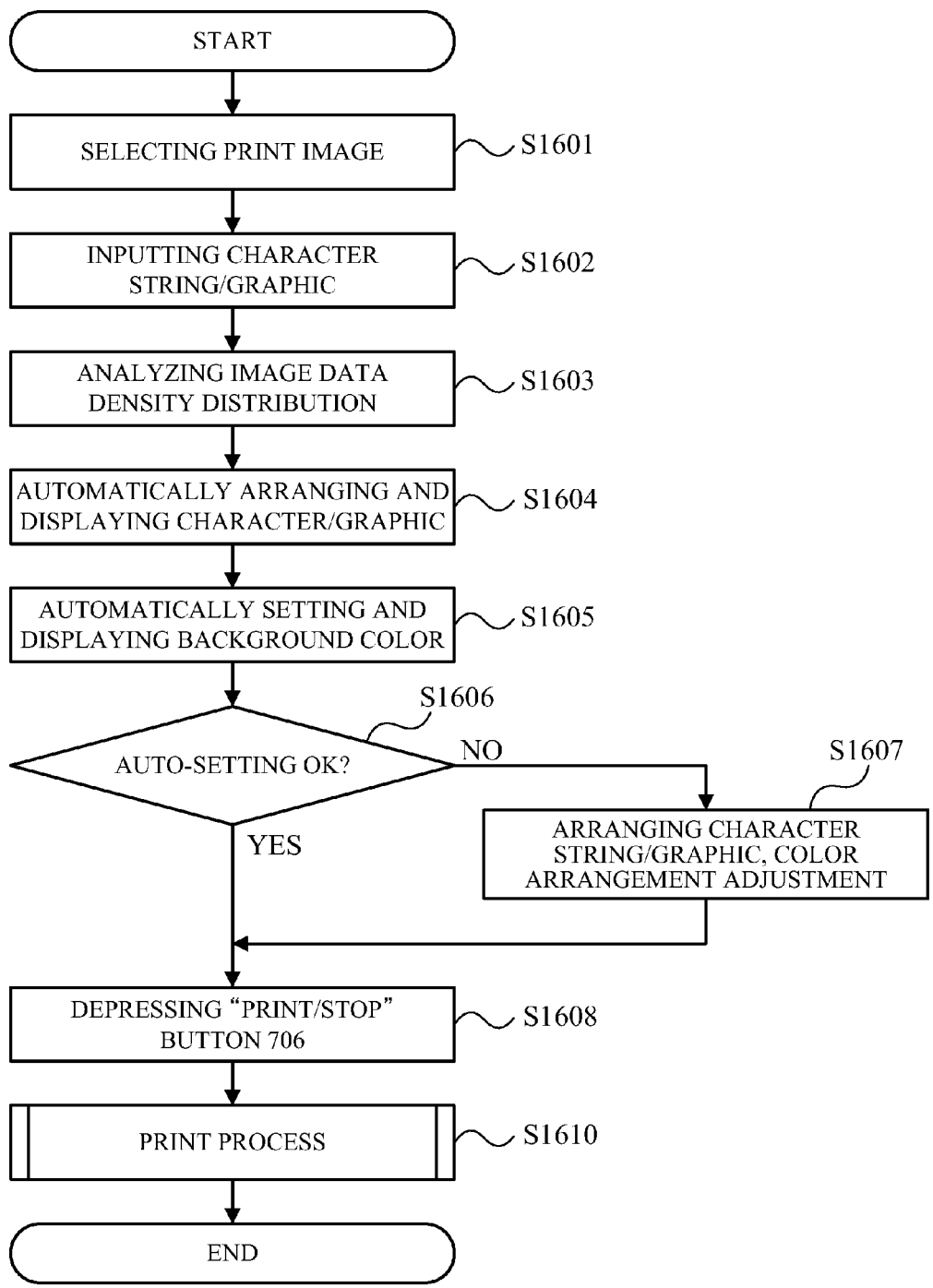
FIG. 16 is a flowchart illustrating a processing procedure of a print apparatus according to the second embodiment of the invention.
Figure 17A:
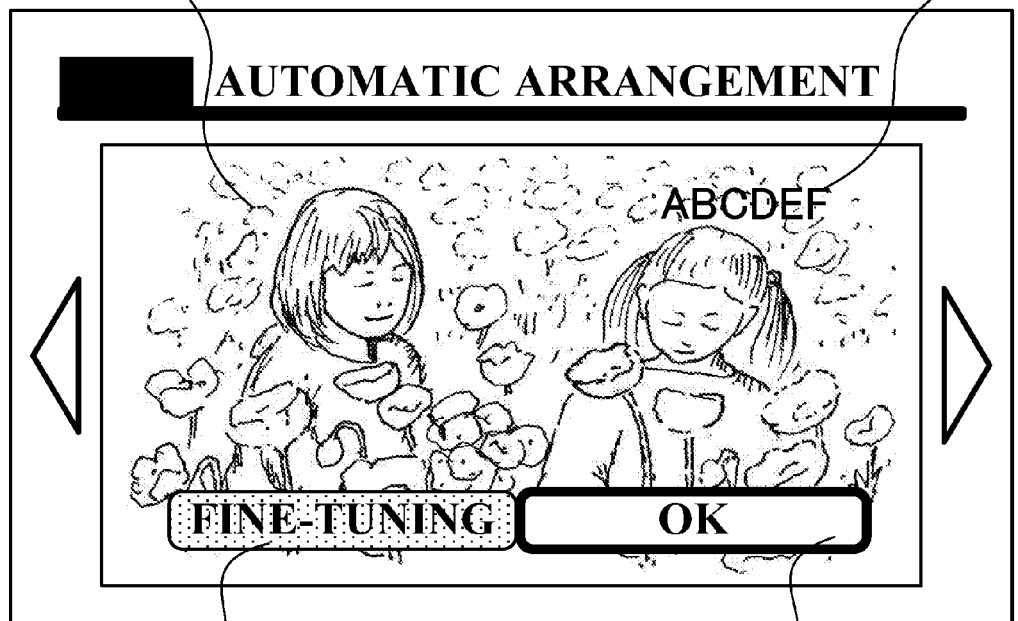
FIGS. 17A and 17B are diagrams illustrating display examples of a GUI of the print apparatus according to the second embodiment of the invention.
Figure 17B:
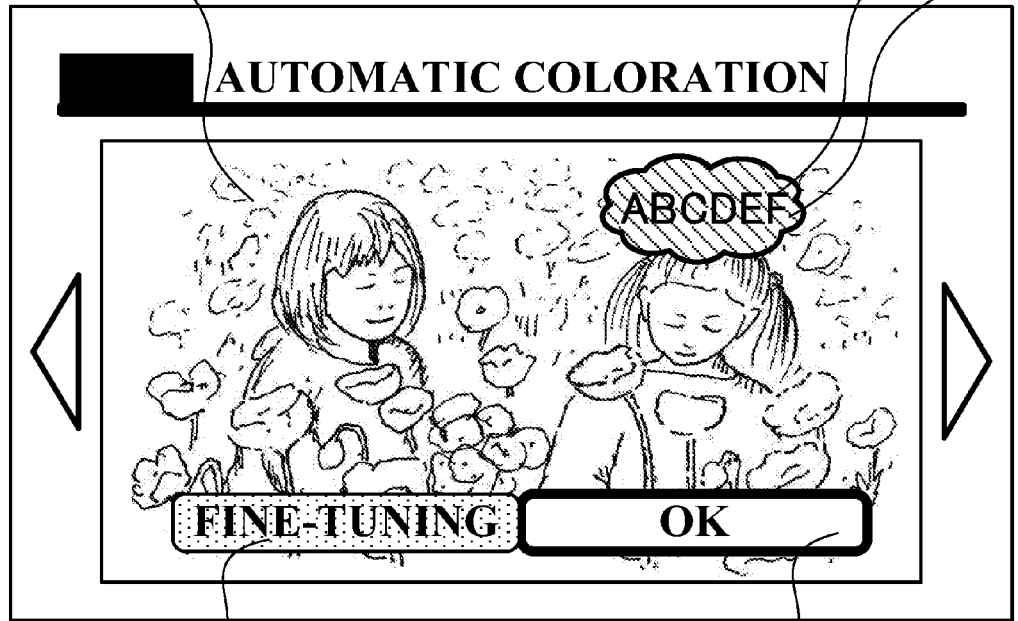

The print setting and print processing operation of a print apparatus according to the second embodiment of the invention will be described in detail hereinbelow with reference to flowcharts. FIG. 16 is a flowchart illustrating a print processing procedure of the print apparatus according to the second embodiment. FIGS. 17A and 17B are diagrams illustrating display examples of a GUI of the display unit 402 at the time when processes illustrated in the flowchart of FIG. 16 are executed. In a manner similar to the first embodiment, the flowchart of FIG. 16 and the display of the GUIs of FIGS. 17A and 17B can be realized by a method whereby the main controller 501 operates in accordance with a computer program stored in the ROM 502.

When the print setting is selected on the menu screen in a manner similar to the first embodiment, image data serving as a print target is selected from the image data which is input by the image data input unit 529 (S1601). Further, a character string/graphic is input and set in accordance with the manner similar to that in the first embodiment (S1602). Subsequently, concentration distribution of the image data serving as a print target is analyzed by the main controller 501 (S1603). An area whose concentration value is equal to or larger than a predetermined concentration value at which the dye removal overcoating non-print area 103 can be identified is searched for on the basis of a size of character string/graphic and the character string/graphic is automatically arranged there. The threshold value of the concentration at which the dye removal overcoat non-print area 103 can be identified has been preset in the print apparatus. The GUI illustrated in FIG. 17A is displayed onto the display unit 402 (S1604). A character string 1702 is automatically arranged in the area of the predetermined concentration value or more in image data 1701. At the time of the automatic arrangement, the character string/graphic may be arranged in such a manner that a face is detected in the image data 1701 (detection of object information) and even in the area of the predetermined concentration value or more, an object portion is avoided. In the case where a balloon graphic 1703 or the like has been set as a background portion (background surface) of the character string 1702 on a favorite print setting screen and a balloon of the color of the predetermined concentration value or more has been added to the image data, the character string/graphic may be automatically arranged in the balloon area.

In the case where the balloon graphic 1703 or the like has been set as a background portion of the character string 1702 on the favorite print setting screen in FIG. 10, an auto coloring processing of the balloon graphic 1703 may be executed. That is, as for the coloring of the balloon graphic 1703, the coloring which is equal to or larger than the predetermined concentration value at which the dye removal overcoating non-print area 103 can be identified is automatically selected and the GUI illustrated in FIG. 17B is displayed onto the display unit 402 (S1605). After that, the user confirms the automatic arrangement of the character string/graphic and the automatic arrangement result of the character string/graphic background portion. If there is no need to change, the user selects an OK button 1704 by operating the four-way operational key 705 and depresses the SET button 712 (YES in S1606). If a fine tuning is necessary, the user selects a fine tuning button 1705 by operating the four-way operational key 705 and depresses the SET button 712 (NO in S1606). In step S1607, the user adjusts the arrangement of the character string/graphic and the coloring of the background portion by using the operation unit 403 while confirming the GUI screen of the display unit 402 (manual adjustment). Instead of executing the auto coloring processing, the colors which can be selected may be restricted so that the balloon color becomes the color of the predetermined concentration value or more.

After the setting, if it is difficult to identify the dye removal overcoating non-print area 103 according to the arrangement of the character string/graphic and the coloring of the background portion which were performed by the user, a message showing such a fact may be notified to the user. After completion of the setting, by depressing the print/stop button 706, the processing routine is transited to a print process (S1610).

In the print process of step S1610, processes of steps S803 to S819 illustrated in the flowchart of FIG. 8 are executed. However, the background portion of the character string/graphic is printed as image data by each color of the ink sheet.

As described above, the arrangement of the character information, graphic information, and the like and the setting of the coloring are automatically performed on the print apparatus side. Therefore, the character information, graphic information, and the like can be concealed by the simpler operation as an area where the overcoating is not printed.

Embodiment 3

Figure 18:
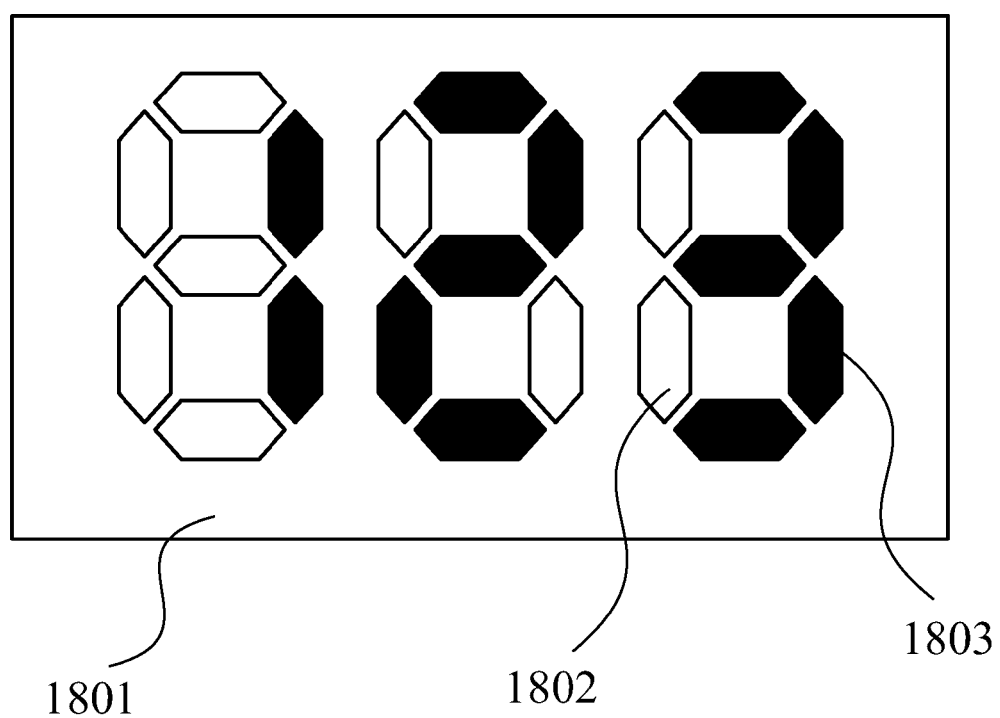
FIG. 18 is a diagram illustrating a print surface of print paper on which a digital character string has been printed by a print apparatus according to the third embodiment of the invention.

The print setting and print processing operation of a print apparatus according to the third embodiment of the invention will be described hereinbelow with reference to FIG. 18. FIG. 18 is a diagram illustrating a part of a print surface of print paper according to the third embodiment. In the embodiment, an overcoating non-print area 1802 is formed in a margin or the like of the print paper on the basis of the input character information or the like. However, in the embodiment, together with the printing of the image data, input information such as numerals, alphabets, or the like is printed into the margin or the like and, thereafter, an overcoating non-print area 1803 is formed. An overcoating print area 1801 is illustrated in the diagram.

The input information may be information showing a memorandum by the user, the number of remaining print papers, or the like. Further, tag information or the like may be printed together with a printed matter and used for management thereof. Those information may be input by the input manner similar to those in the first and second embodiments or may be automatically properly set by the setting screen. A position of the overcoat non-print area 1803 can be also manually or automatically set in a manner similar to the first or second embodiment. When the printed information becomes unnecessary, by scraping dye removal overcoating non-print area 1803, the dyes constructing the numerals or alphabets can be removed.

Although the overcoating non-print area 1802 is formed in a shape of digital characters in FIG. 18, a shape of the area 1802 may be a belt-shape according to the character string, a rectangular shape according to the character, or the like. The overcoating non-print area 1802 may be formed so as to have such an area shape that remains as a QB code (two-dimensional bar code), character string/graphic, or the like when the dye print area is removed.

As described above, the embodiment is constructed in such a manner that when the position of the input information is set in an area other than the image data print area on the print medium, the input information is printed at the set position. By such a construction, the character information, graphic information, and the like are printed onto the print paper as necessary and when they become unnecessary, they can be easily erased merely by scraping the print surface.

Embodiment 4

The print setting and print processing operation of a print apparatus of the fourth embodiment of the invention will be described hereinbelow with reference to FIGS. 19A and 19B. FIGS. 19A and 19B are schematic diagrams illustrating cross sections of print papers printed by the print apparatus according to the fourth embodiment. In the embodiment, a shape of an edge portion of the overcoating 305 is accomplished by a correcting process of the print data of the overcoating. That is, in the invention of this embodiment, a gradation value change of the protection layer of a boundary portion between the area where the protection layer is not printed and the area where the protection layer is printed is corrected.

FIG. 19A illustrates a state where a gradation value of an edge portion 1901 of the overcoating 305 at a boundary between an area where the overcoating 305 is not printed and an area where the overcoating 305 is printed changes steeply (a change from the gradation value 0 to the gradation value 170; maximum value change ratio). According to the embodiment, a correcting process such as an edge emphasis or the like is executed to the print data so as to form the edge portion of the overcoating. That is, in the edge correcting process, an edge correction is made so as to maximize the gradation value change of the protection layer of the boundary portion between the area where the protection layer is not printed and the area where the protection layer is printed.

According to the embodiment, such an advantage that when the dye print area is removed, an outline of the character string/graphic becomes clear is attained.

FIG. 19B illustrates a state where a gradation value of an edge portion 1902 at a boundary between the area where the overcoating 305 is not printed and the area where the overcoating 305 is printed changes step by step (a change ratio smaller than the maximum value) from 0 to 170 or from 170 to 0. According to the embodiment, a correcting process of the print data can be executed so as to form the edge portion of the overcoating as mentioned above. That is, according to the edge correcting process, the edge correction is made so that a change in gradation value of the protection layer in the boundary portion between the area where the protection layer is not printed and the area where the protection layer is printed is smaller than the maximum value.

By the above processes, such an advantage that it becomes difficult to distinguish the boundary between the area where the overcoating is not printed and the area where the overcoating is printed is attained. The change ratio of the gradation value is not limited to that illustrated in each of FIGS. 19A and 19B but may be corrected to another change ratio.

As described above, according to the invention, the print apparatus which can attain printing in such a manner that the character information, graphic information, and the like are provided at an arbitrary desired position as an area where the overcoating is not printed and the character information, graphic information, and the like can be concealed can be provided. The print apparatus which can attain printing in such a manner that the unnecessary character information, graphic information, and the like can be erased, can be provided.

According to the foregoing embodiments, specific examples upon embodying the invention have merely been shown above and the technical scope of the invention should not be limitatively interpreted by them. That is, the invention can be embodied by various forms without departing from the technical idea of the invention or the main feature thereof. Although the embodiments have been described above with respect to the roll paper print apparatus, the invention can be also applied to a print apparatus using cut sheets or other print paper. The invention can be also applied to another print apparatus of an ink jet system so long as the protection layer is formed. Although the embodiments have been described above with respect to the case where the concealed portion is the character information/graphic information, the invention is not limited to such an example. For instance, all contents which can be printed by the print apparatus such as icons, encoded code information, and the like are incorporated in the character information and graphic information. The control of the main controller 501 may be made by one hardware or it is also possible to construct in such a manner that a plurality of hardware share the processes, thereby making the control of the whole apparatus.

Naturally, the objects of the invention are also accomplished by constructing in such a manner that a storage medium in which a program code of software for realizing the functions of the embodiments mentioned above has been recorded is supplied to a system or an apparatus. In this case, a computer (or a CPU or MPU) of the system or apparatus reads out the program code stored in a computer-readable storage medium and executes it, so that the foregoing functions are realized. In this case, the storage medium in which the program code has been stored constructs the invention. As a storage medium for supplying the program code, for example, a floppy (registered trademark) disk, a hard disk, an optical disk, a magnetooptic disk, a CD-ROM, a CD-R, a magnetic tape, a non-volatile memory card, a ROM, or the like can be used.

The invention is not limited to the case where the functions of the embodiments mentioned above are realized by a method whereby the computer executes the read-out program code. For example, naturally, the invention also incorporates a case where an OS (operating system) or the like which is operating on the computer executes a part or all of actual processes on the basis of instructions of the program code and the functions of the embodiments mentioned above are realized by those processes.

Further, the invention also incorporates a case where the program code read out of the storage medium is written into a memory provided for a function expanding board inserted in the computer or a function expanding unit connected to the computer and, thereafter, the functions of the embodiments mentioned above are realized. That is, the invention also incorporates a case where after the program code was written into the memory, a CPU or the like provided for the function expanding board or function expanding unit executes a part or all of the actual processes on the basis of the instructions of the program code and the functions of the embodiments mentioned above are realized by those processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-186774 filed on Aug. 24, 2010, which is hereby incorporated by reference herein in its entirety.

What is claimed is:

1. A print apparatus for printing an image based on image data and a protection layer onto a print medium, comprising:
   an image data input in communication with a main controller and configured to input the image data;
   an information input device configured to input information different from the image data;
   a printer configured to print the image onto the print medium on the basis of the image data input by the image data input and print the protection layer on the basis of the information input by the information input device, wherein the protection layer is printed onto a print surface of the print medium on which the image has been printed;
   and
   the main controller configured to control the printing of the image and the printing of the protection layer, wherein the main controller controls the printing of the protection layer so that a non-print area where the protection layer is not printed is formed on the basis of the information input by the information input device,
   wherein the protection layer printed by the printer prevents the image printed on the print medium by the printer from being removed and the printed image in the non-print area where the protection layer is not printed is removed when being scraped, and
   wherein the main controller controls to form the non-print area wherein the protection layer is not printed, in an area where a concentration of the image data is equal to or larger than a predetermined concentration.

2. An apparatus according to claim 1, further comprising:
   a position setting unit implemented by the main controller and configured to set a position where the information input by the information input device is printed; and
   wherein the main controller restricts the position to be set by the position setting unit, so that the non-print area is formed in the area where the concentration of the image data is larger than the predetermined concentration.

3. An apparatus according to claim 2, further comprising:
   a display configured to display a warning when the concentration of the image data at the position set by the position setting unit is lower than the predetermined concentration.

4. An apparatus according to claim 1, wherein the information input by the information input device includes at least one of character information, graphic information, and encoded code information.

5. An apparatus according to claim 1, wherein the main controller controls the printing so that a concentration of the image printed in the non-print area where the protection layer is not printed is equal to or larger than a predetermined concentration.

6. An apparatus according to claim 2, wherein the main controller detects object information included in the image data and sets the print position of the information on the basis of the detected object information and the concentration value.

7. An apparatus according to claim 2, further comprising a manual adjustment input device configured to manually adjust the position set by the position setting unit.

8. An apparatus according to claim 2, further comprising:
a display configured to display the image data input by the image data input and the information input by the information input device, in accordance with the settings made by the position setting unit.

9. An apparatus according to claim 2, wherein the main controller controls the printer so as to print a background image having a concentration equal to or larger than a predetermined concentration to the position set by the position setting unit.

10. An apparatus according to claim 1, wherein the main controller has an edge correcting unit configured to correct a change in gradation value of the protection layer of a boundary portion between an area where the protection layer is not printed and an area where the protection layer is printed.

11. An apparatus according to claim 10, wherein the edge correcting unit makes an edge correction to maximize the change of the gradation value of the protection layer of the boundary portion between the area where the protection layer is not printed and the area where the protection layer is printed.

12. An apparatus according to claim 10, wherein the edge correcting unit makes an edge correction to set the change of the gradation value of the protection layer of the boundary portion between the area where the protection layer is not printed and the area where the protection layer is printed, to a value smaller than a maximum value.

13. An apparatus according to claim 1, further comprising a balloon setting unit implemented by the main controller and configured to add a balloon to the image data input by the image data input.

14. An apparatus according to claim 13, wherein, in a case where the image data input by the image data input is added with the balloon and printed, the main controller controls to set a color of the balloon to have a concentration equal to or larger than a predetermined concentration, and to form the non-print area where the protection layer is not printed at a position where the balloon is printed.

15. An apparatus according to claim 1, further comprising an ink sheet in which ink of a plurality of colors and ink for protection are sequentially arranged, and
wherein the printer prints the image by transferring the ink of the plurality of colors of the ink sheet onto the print medium and prints the protection layer by transferring the ink for protection of the ink sheet onto the print medium.

16. A control method of a print apparatus for printing image data onto a print medium together with a protection layer, comprising:

inputting the image data;
inputting information different from the image data;
printing an image onto the print medium on the basis of the image data input in the image data input step and printing the protection layer on the basis of the information different from the image data input in the inputting step, wherein the protection layer is printed onto a print surface of the print medium on which the image has been printed;
and
controlling the printing of the image and the printing of the protection layer, and controlling the printing of the protection layer so that a non-print area where the protection layer is not printed is formed on the basis of the information different from the image data input in the inputting step,
wherein the protection layer printed in the printing step prevents the image printed on the print medium in the printing step from being removed and the printed image in the non-print area where the protection layer is not printed is removed when being scraped, and
wherein the controlling step forms the non-print area wherein the protection layer is not printed, in an area where a concentration of the image data is equal to or larger than a predetermined concentration.

17. A computer-readable non-transitory storage medium storing a program for causing a computer to function, in a control method of a print apparatus for printing image data onto a print medium together with a protection layer, as each of:
an image data input in communication with a main controller configured to input image data;
an information input device configured to input information different from the image data;
a printer configured to print an image onto a print medium on the basis of the image data input by the image data input and print a protection layer on the basis of the information input by the information input device, wherein the protection layer is printed onto a print surface of the print medium on which the image has been printed;
and
the main controller configured to control the printing of the image and the printing of the protection layer, wherein the main controller controls the printing of the protection layer so that a non-print area where the protection layer is not printed is formed on the basis of the information input by the information input device,
wherein the protection layer printed by the printer prevents the image printed on the print medium by the printer from being removed and the printed image in the non-print area where the protection layer is not printed is removed when being scraped, and
wherein the main controller controls to form the non-print area wherein the protection layer is not printed, in an area where a concentration of the image data is equal to or larger than a predetermined concentration.

* * * * *